(12) United States Patent
Fankhauser et al.

(10) Patent No.: US 12,163,721 B2
(45) Date of Patent: Dec. 10, 2024

(54) AUTOMATED STORAGE SYSTEM INCLUDING MULTIPLE CLIMATE ZONES

(71) Applicant: SSI Schäfer Automation GmbH (AT), Graz (AT)

(72) Inventors: Robert Fankhauser, Dobl (AT); Christoph Grössl, Graz (AT); Kathrin Maierhofer, Gratwein-Strassengel (AT)

(73) Assignee: SSI Schäfer Automation GmbH (AT), Graz (AT)

( * ) Notice: Subject to any disclaimer, the term of this patent is extended or adjusted under 35 U.S.C. 154(b) by 0 days.

(21) Appl. No.: 18/703,767

(22) PCT Filed: Sep. 27, 2022

(86) PCT No.: PCT/EP2022/076853
§ 371 (c)(1),
(2) Date: Apr. 23, 2024

(87) PCT Pub. No.: WO2023/083524
PCT Pub. Date: May 19, 2023

(65) Prior Publication Data
US 2024/0328699 A1    Oct. 3, 2024

(30) Foreign Application Priority Data
Nov. 11, 2021   (DE) ............... 10 2021 129 397.9

(51) Int. Cl.
*B65G 1/04*     (2006.01)
*B65G 1/06*     (2006.01)
(Continued)

(52) U.S. Cl.
CPC ........... *F25D 13/04* (2013.01); *B65G 1/0492* (2013.01); *B65G 1/065* (2013.01); *B65G 1/1378* (2013.01)

(58) Field of Classification Search
None
See application file for complete search history.

(56) References Cited

U.S. PATENT DOCUMENTS 8,974,168 B2 * 3/2015 Yamashita ............... B65G 1/04
                                                  414/277
10,202,240 B2 * 2/2019 De Angelis ............ A47B 63/00
(Continued)

FOREIGN PATENT DOCUMENTS

DE      19548500 A1    6/1997
DE      10011205 A1    9/2001
(Continued)

OTHER PUBLICATIONS

International Preliminary Report on Patentability for corresponding International Application No. PCT/EP2022/076853, mailed May 23, 2024.
(Continued)

*Primary Examiner* — Mark C Hageman
(74) *Attorney, Agent, or Firm* — Jason H. Vick; Womble Bond Dickinson (US) LLP

(57) ABSTRACT

There are disclosed a picking method (100) as well as an automated storage system (12) including a high-temperature zone and a low-temperature zone. The storage system comprises: at least one rack (30) including several rack levels (36) on top of each other and an aisle (32) laterally adjacent to the rack (30); a plurality of shuttle (50) in the aisle for storing and retrieving storage goods (70) in and from storage locations (42) of the at least one rack (30) and for horizontally transporting the storage goods (70); a stationary lifter (16) for vertically transporting the storage goods (70); and a tub (34) defining the low-temperature zone (52); wherein, in a height region of at least one of the rack levels (36), the tub (34): encloses, in a circumferentially closed manner, a group of contiguous storage locations (42) and the lifter (16);
(Continued)

encloses closed downwards the group of contiguous storage locations (42); encloses closed, or closable, downwards the lifter (16); and is open upwards.

23 Claims, 6 Drawing Sheets

(51) Int. Cl.
    *B65G 1/137*      (2006.01)
    *F25D 13/04*      (2006.01)

(56) References Cited

U.S. PATENT DOCUMENTS

| | | | |
|---|---|---|---|
| 11,067,329 B2* | 7/2021 | Boer | B65G 1/0492 |
| 2020/0166267 A1* | 5/2020 | Boer | F25D 13/06 |

FOREIGN PATENT DOCUMENTS

| | | |
|---|---|---|
| EP | 1128140 A1 | 8/2001 |
| EP | 2543611 A1 | 1/2013 |
| WO | WO 2020/110041 A1 | 6/2020 |

OTHER PUBLICATIONS

International Search Report for corresponding International Application No. PCT/EP2022/076853, mailed Jan. 31, 2023.
Written Opinion for corresponding International Application No. PCT/EP2022/076853, mailed Jan. 31, 2023.
Examination Report (Including Translation) for Corresponding German Patent Application No. 102021129397.9, mailed Aug. 24, 2022.
Notice of Grant (Including Translation) for Corresponding German Patent Application No. 102021129397.9, mailed Oct. 10, 2022.

* cited by examiner

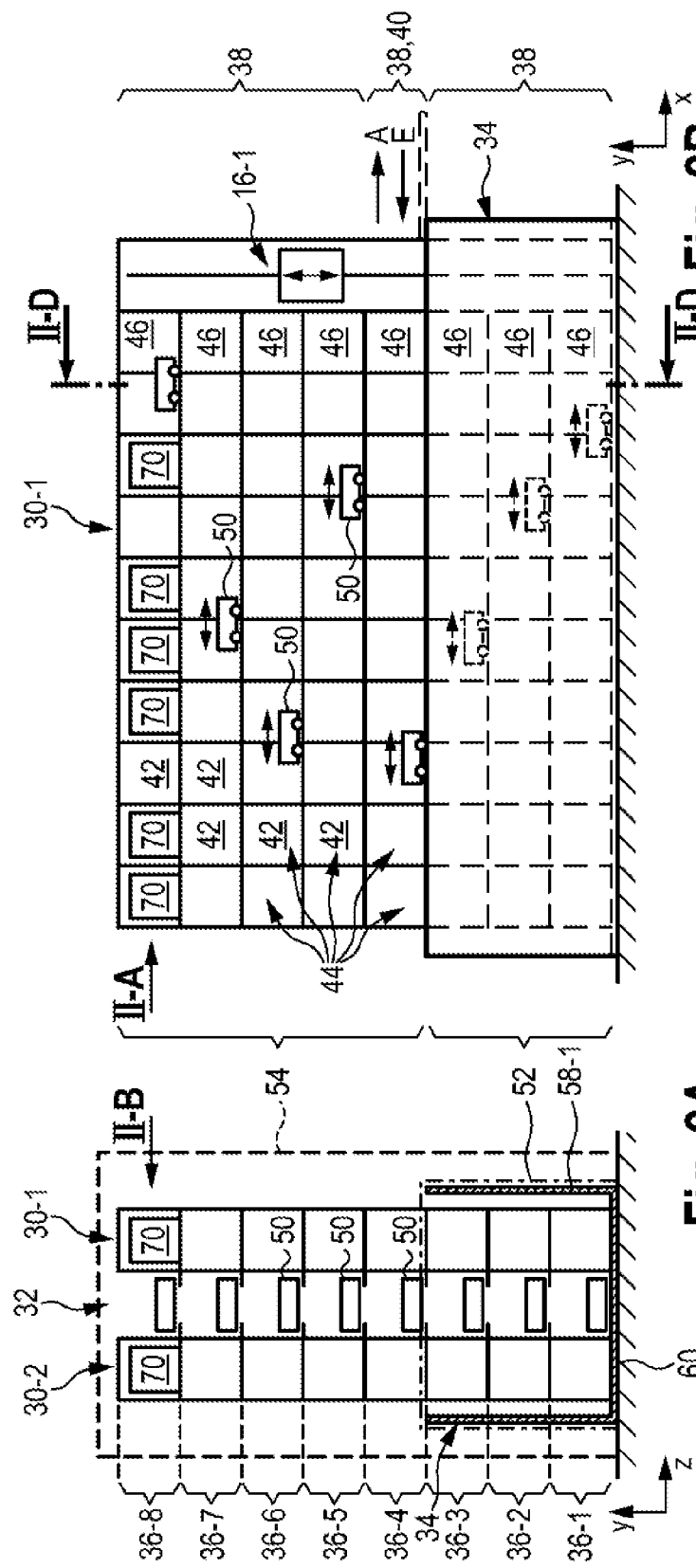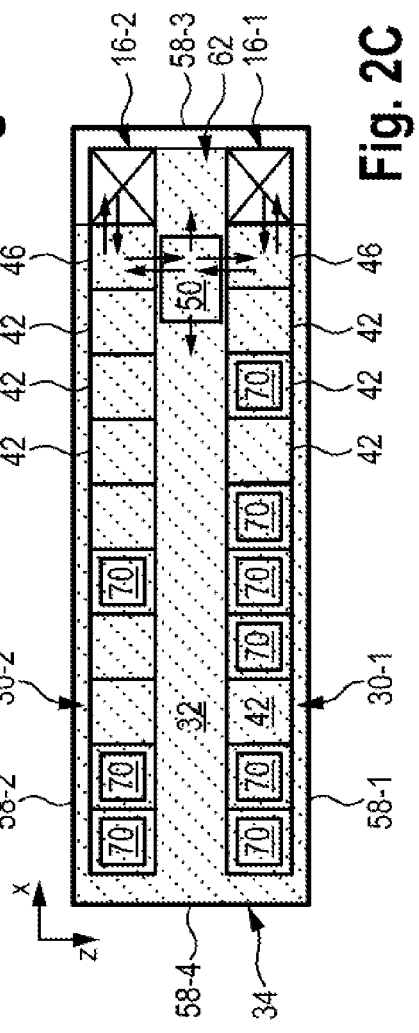

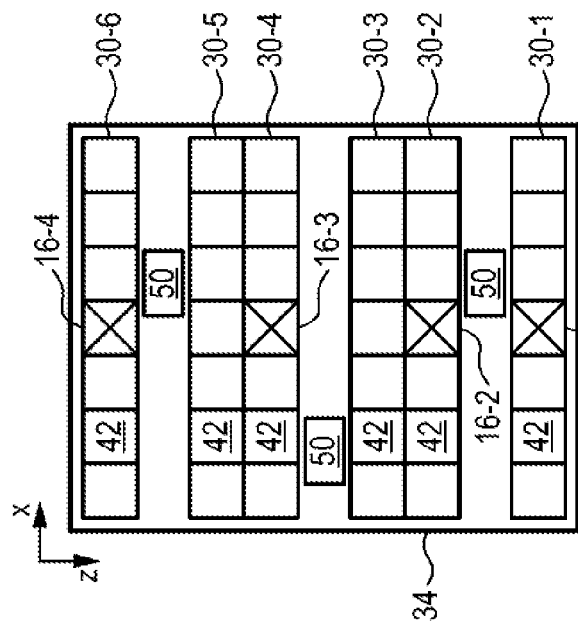
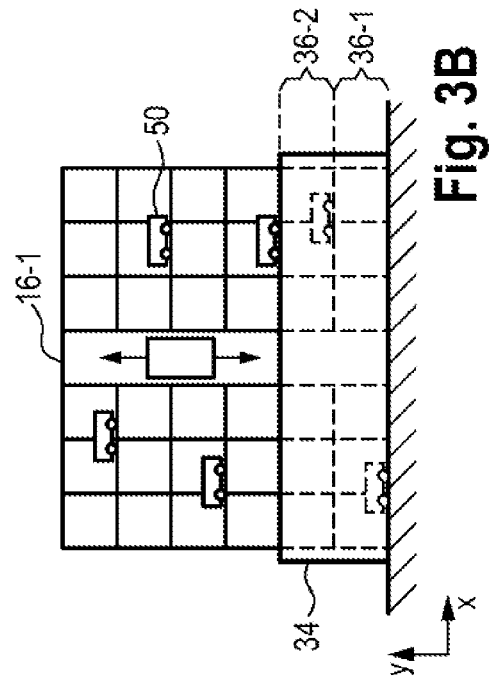
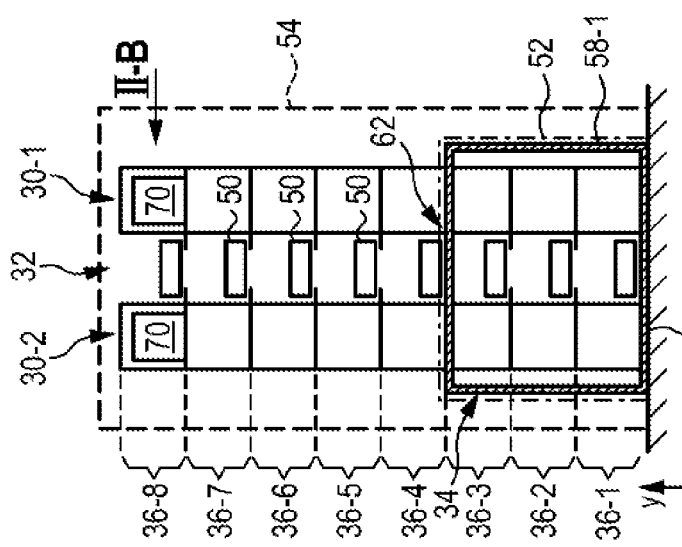

AUTOMATED STORAGE SYSTEM INCLUDING MULTIPLE CLIMATE ZONES

CROSS REFERENCE TO RELATED APPLICATIONS

This application is a national stage application under 35 U.S.C. 371 of PCT Application No. PCT/EP2022/076853 having an international filing date of 27 Sep. 2022, which designated the United States, which PCT application claimed the benefit of German Application No. 10 2021 129 397.9, filed 11 Nov. 2021, each of which are incorporated herein by reference in their entirety.

The present invention relates to a picking method, as well as to an automated storage system including high-temperature zone and low-temperature zone.

The document WO 2020/110 041 A1 (Dematic) describes an automated shuttle-rack storage system including two temperature zones. This storage system comprises: a rack with several storage-location levels and with an aisle coupled to the longitudinal side of the rack on each level; a plurality of rail-guided shuttles in the aisle for storing and retrieving storage goods in and from storage-rack locations on the levels; and a thermally-insulated jacket, which encloses (hermetically) sealed some of the levels for forming a rack region at a temperature lower than with the remaining levels in each of the three spatial directions. Two types of pairs of temperature zones are discussed: a first pair consisting of deep-freeze zone and cooled (warmer) zone, and a second pair of cooled zone and (warm) ambient-temperature zone (for example, at 21° C.).

The jacket is formed of: vertical sidewalls arranged circumferentially; a closed ceiling oriented horizontally; and a closed base oriented horizontally; wherein all of these elements are connected to each other such that one closed space is formed which completely encloses the zone at the lower temperature.

Transfer of storage goods, in terms of material flow, between the zones takes place through one of the sidewalls exclusively horizontal, and in extension of the rack-storage locations. The shuttles do not leave the zones assigned thereto. The shuttles transport the storage goods, and store and retrieve them, within their respective zone. At interfaces between the zones, within the racks—instead of storage locations—horizontal transfer conveyors are provided, which receive the storage goods from the shuttles, convey them horizontally out of the zone, and deliver them to further transfer conveyors provided externally, which in turn deliver the storage goods to external lifters in the high-temperature zone for vertical transport (retrieval), and vice versa (storage). The interfaces, which are provided at the transitions between the internal and external transfer conveyors, are provided with air curtains or movable gates through which (exclusively) the storage goods may, and are allowed to, pass between the transfer conveyors.

The gates need to be open, at least short-time, for a horizontal passage of the storage goods. Due to natural convection colder air emerges from the enclosed zone during this phase. The cold air moves downwards and therefore "falls" out. The gates cannot be eliminated. The same is true for the air curtains which need to be operated continuously and permanently for preventing the cold air from emerging. If air curtains are used instead of the mechanical gates, the air curtains cannot be eliminated.

The jacket, substantially (air) tight in all three spatial directions, of the pre-known lower-temperature zone is costly and expensive. A lot of jacket material is required. Gates and/or air curtains are mandatory in order to be able to realize the material flow without higher thermal losses.

Horizontal jacket sections, in particular ceiling sections, between the vertical neighboring zones are difficult to access because typically (rack) storage locations are provided there. This complicates the installation and maintenance of these jacket sections, in particular the ceiling elements. Alternatively, storage locations need to be removed, or at least the rack partitioning needs to be changed, for enhancing the accessibility by creating space. In general, the rack construction must be changed which results in reduction of the storage-location capacity.

The movable gates and/or the air curtains at the interfaces represent additional components making the overall system more expensive, and making control more complex.

The movable mechanical gates need to be opened and closed actively (in synchronization with the transfer of storage goods) which increases the controlling effort.

The air curtains need to be operated continuously for permanently providing a separating flow of air, which acts against a (horizontal) exchange of air, or heat, between the neighboring zones of different temperatures. A lot of energy is required for this purpose.

Additional problems, which can result from utilization of the jacket in accordance with WO'041 A1 in a storage-rack arrangement, can be seen in fire protection and accessibility. Current concepts of fire protection assume that extinguishing water can run from the top to the bottom through the rack via all rack levels. This is not possible in the low-temperature zone because the jacket defines a hermetically sealed space which the extinguishing water cannot enter. As a result, accessibility and escape problems also arise because at least one additional escape route for the maintenance technician needs to be provided within the low-temperature zone beside the normal access, and (dependent on a length of an aisle) several escape routes need to be provided typically.

The document DE 195 48 500 A1 discloses, in accordance with its abstract, a multi-aisle high-bay warehouse for storing uncooled and cooled goods which is configured such that a cold zone is arranged in a layer beneath a warm zone. Transition region between the zones is held small and stable by feeding cold air at the base of the cold zone, and discharging same in the transition region. Therefore, failures of individual storage and retrieval devices do not jeopardize operation of the storage.

The document DE 100 11 205 A1 discloses, in accordance with its abstract, a warehouse, in particular a high-bay warehouse, including at least two storage regions of different temperatures arranged on top of each other, wherein in a first lower one of the storage regions temperatures are to be provided, or are provided, lower than in a second upper one of the storage regions, wherein at least one of the storage regions is associated with at least one region for feeding a cooling medium. It is provided that the at least one region for providing a cooling medium, which region is associated with a storage region, is arranged above a discharging region.

Therefore, it is an object to provide an improved storage system, as well as an improved picking method being operable in two temperature zones.

This object is solved by an automated storage system, which incudes high-temperature zone and low-temperature zone, comprising: at least one rack including several rack levels on top of each other and an aisle laterally adjacent to the rack; a plurality of shuttles in the aisle for storing and retrieving storage goods in and from storage locations of the at least one rack and for horizontally transporting the storage goods; a stationary lifter for vertically transporting the storage goods; and a tub defining the low-temperature zone; wherein, in a height region of at least one of the rack levels, the tub: encloses, in a circumferentially closed manner, a group of contiguous storage locations and the lifter; encloses, closed downwards, the group of contiguous storage locations; encloses, closed, or closable, downwards, the lifter; and is open upwards at least for the lifter, or in particular completely.

In contrast to the storage system discussed at the beginning, the present development can completely eliminate gates and air curtains, because the storage goods exit the low-temperature zone exclusively via (horizontally oriented) openings in the ceiling of the tub which do not need to be closed, neither mechanically nor by an air curtain. Gates and air curtains are not required. The tub can (permanently) remain open upwards and does not need to be closed by an air curtain either, because the natural convection takes care that the cooler air remains in the tub. The cooler air cannot escape independently through an opening in the ceiling of the tub, even if the tub is completely formed open upwards, i.e. does not comprise any ceiling elements. Lateral openings are not present in the tub through which air could "fall" out of the low-temperature zone.

The performance of the lifter(s) alone is not sufficient for operating the low-temperature zone at a sufficient throughput (storages and/or retrievals of storage goods per unit of time). From this point of view, it is not necessary that the storage goods are stored and retrieved horizontally.

The displacement of the openings from the sidewalls of the conventional jacket into the ceiling of the tub, the use of the lifters instead of the shuttles or transfer conveyors for the material flow, and in particular the complete elimination of a jacket ceiling allows eliminating mechanical gates, which need to be controlled actively, and alternative air curtains, which need to be operated permanently. The investment costs are lower. The controlling effort is lower.

The present development allows vertical layering of a storage system, and in particular of a rack, into different climate zones, wherein the tub, which is at least partially open upwards in the region of the lifters, can be installed easily, in particular at the base of the rack(s). Since the tub is open upwards, a ceiling is lacking, preferably completely, which is difficult to install in the rack. When the entire ceiling is lacking storage locations are not lost either, so that the storage capacity remains unchanged. The vertical partitioning of the rack locations, or storage locations, remains unchanged in this case. In this case, maintenance regions for the ceiling are not required. The initial investment costs are even lower.

The tub can be retrofitted into existing rack-storage systems. The tub consists of few simple elements which can be installed in an uncomplicated manner. Preferably, these elements do not comprise movable parts, or openings, for allowing the shuttles to pass through the tub. Thereby, the controlling and wiring effort is again decreased.

Exchange of storage goods occurs exclusively via the lifter. In this manner also the formation of condensation and ice on the shuttle is avoided because the shuttles do not exit the tub.

Optionally, sufficient space for an optional artificial partition of the zones, by means of circulating air (air curtain), remains in the region of the interface between the low-temperature zone at least partially open upwards and the high-temperature zone above and outside the tub.

Further, it is advantageous if the low-temperature zone and the high-temperature zone are connected to each other, in terms of material flow, during normal operation of the storage system via the lifter only.

In this case, the shuttles do not leave the tub so that problems due to formation of condensation and ice are excluded, or reduced. Should one of the shuttles have a malfunction, this shuttle can leave the low-temperature zone (malfunction mode), for example, through an optional opening in one of the face walls of the tub.

Preferably, each of the shuttles is operated either exclusively in the high-temperature zone or exclusively in the low-temperature zone.

The shuttles do not change the temperature zone respectively assigned thereto. In this way, formation of condensation and ice on the shuttles is excluded.

In particular, the low-temperature zone is operated at a temperature of more than 0° C., preferably in a range of 0° C. to 10° C. and more preferably in a range of 2° C. to 8° C., wherein the high-temperature zone is operated at a temperature being greater than the temperature of the low-temperature zone, and being preferably the ambient temperature.

Thus, the storage system is predestined for handling chilled products such as those often found in the fresh region of a food retailer (e.g., fruit and vegetables). Fresh products can be stored in the low-temperature zone, which can then be picked together with uncooled products (e.g., flour, pasta, etc.).

The tub allows easy separation of a storage region where the fresh products can be stored. The remaining regions of the storage can still be operated at the ambient temperature. The fresh region can be retrofitted into an existing storage. Thus, separate picking of normal products and fresh products is not performed in two storages, one single storage is sufficient. Two storages do not need to be provided. The initial invest of the operator of the storage is extremely low since substantially only the tub—preferably in a lower region of the rack(s)—needs to be built around the rack locations. The ceiling, which is difficult to install, is eliminated.

In a preferred embodiment the storage system further comprises at least one transfer location (buffer location) arranged within the tub between the lifter and the group of contiguous storage locations.

The transfer location decouples, in terms of material flow, the shuttles from the lifter. The shuttles and the lifter do not need to wait mutually for exchanging storage goods.

In particular, the tub is formed without a cover, i.e. cover-free, at least in the region of the lifter, and preferably completely. In particular, the tub is formed of sidewalls and a base only.

Thus, the tub does not comprise any ceiling, or at least a reduced one, however without comprising lateral openings. Less material is required for forming the tub and nevertheless achieving a clear separation between the low-temperature zone and the high-temperature zone. Natural convection alone is responsible for separation between the temperature zones. Opening and closing the low-temperature zone is eliminated. The low-temperature zone is always open to the material flow.

It is understood that the storage system may further comprise a cooling system being configured to supply cooled air at a predetermined temperature to the low-temperature zone.

The cooling system can be positioned within, or outside, the low-temperature zone, but within the storage system.

Alternatively, the cooling system can be positioned outside the storage system, and be connected, for example, via lines to the tub, i.e. the low-temperature zone.

Preferably, the tub is formed of, in particular plate-shaped, insulating elements, a film, roll-down curtains, and/or a thermally-insulated awning.

These elements can simply be built around the selected rack-storage locations for defining the low-temperature zone. They are provided with sufficient thermal insulation for keeping the temperature inside the tub low.

Further, it is advantageous if the lifters connect, in terms of material flow, all rack levels vertically to each other.

One single lifter is sufficient for connecting all rack levels to each other and supplying the same. Multiple lifters (for each zone at least one) do not need to be provided for vertically connecting all zones.

In particular, one of the rack levels is a storage/retrieval level which is positioned above or below the tub.

This exchange of storage goods between the low-temperature zone and the high-temperature zone thus occurs via the lifter only. The shuttles do not leave the low-temperature zone, i.e. the tub. A conveying system, which is required for supplying (storage/retrieval) the storage system, i.e. the racks, with storage goods, is provided in a region different to the tub. The tub itself is thus easily accessible for maintenance purposes.

Since the storage/retrieval level is at a height different to the tub, the shuttles do not need to penetrate the tub either. Formation of condensation and ice on the shuttle can be avoided.

Further, it is preferred to integrate the automated storage system into a storage and picking system.

The storage and picking system further comprises at least one of the following components: at least one picking station; a conveying system; a goods receipt; and/or a goods issue.

Thus, the automated storage system is part of a picking system which is used for processing (customers') orders (e.g., orders with an online retailer, in particular in the food sector). The picking system includes a goods receipt where to-be-stored goods arrive, and a goods issue where picked products leave the system. The transport of the products within the system is performed by the conveying system. The picking itself occurs at at least one picking station.

Further, the object is solved by a method for picking cooled storage goods, which are stored in a low-temperature zone defined within a tub, which is open upwards for at least one or more lifters (16) and otherwise preferably closed, of an automated storage system, which is preferably formed in accordance with the above described type, and uncooled storage goods, which are stored in a high-temperature zone of the storage system, in accordance with an order, wherein the method comprises the steps of: determining that the order includes a cooled storage good; moving the shuttle, exclusively within the tub, to the storage location of a rack where the cooled storage good is stored which has been determined before; retrieving, by the shuttle, the cooled storage good; transporting, by the shuttle, the retrieved cooled storage good, to a transfer location of the lifter, or directly to the lifter, reaching vertically into the tub, wherein the transfer location is also arranged in the tub; transferring the retrieved cooled storage good directly to the lifter, or indirectly via the transfer location to the lifter; and vertically transporting, by the lifter, the transferred cooled storage good from the tub to a storage/retrieval level of the rack, wherein the storage/retrieval level is in the high-temperature zone.

Further, it is preferred if the cooled storage good is transported to a picking station where the picking occurs subsequently.

It is understood that the above-mentioned and hereinafter still to be explained features cannot be used in the respectively combination only but also in different combinations, or alone, without departing from the scope of the present disclosure.

Exemplary embodiments are illustrated in the drawings and will be explained in more detail in the following description.

FIG. 1 shows a block diagram of an automated storage system exemplarily integrated into a storage and picking system;

FIG. 2 shows front view (FIG. 2A) of a storage system including a tub which is completely open upwards; side view (FIG. 2B) of the storage system of FIGS. 2A and 2D; top view (FIG. 2C) of the storage systems of FIGS. 2A and 2D, and sectional view (FIG. 2D) of a modified storage system including a tub which is open upwardly in the region of lifters only, wherein each variation of the storage systems of FIGS. 2A and 2D is formed, for example, of two rack (row)s, an aisle therebetween, two lifters, and a tub;

FIG. 3 shows top view (FIG. 3A) and side view (FIG. 3B) of a modified storage system;

The automated storage system 12, which is proposed here, can be used in storage and picking systems 10 of intralogistics, and in particular as a storage for picking food (e-commerce, e-grocery, micro fulfillment center, etc.).

Intralogistics comprises logistical flows of materials and goods that take place within a company premises, in particular within a company building. The term intralogistics was defined in order to create a distinction from the transport of goods outside the premises, which is carried out, for example, by a forwarding agent between two business premises. The term intralogistics can be defined as the organization, control, performance, and optimization of the internal flow of goods (e.g., products in distribution and shipping) and the material flow (e.g., pre-products, intermediate products, and final products in production logistics), of information flows, and of the handling of goods and materials in industry and trade. In the following, for the sake of simplicity, it will be referred to material flow only, even if products are transported.

Figure 1:
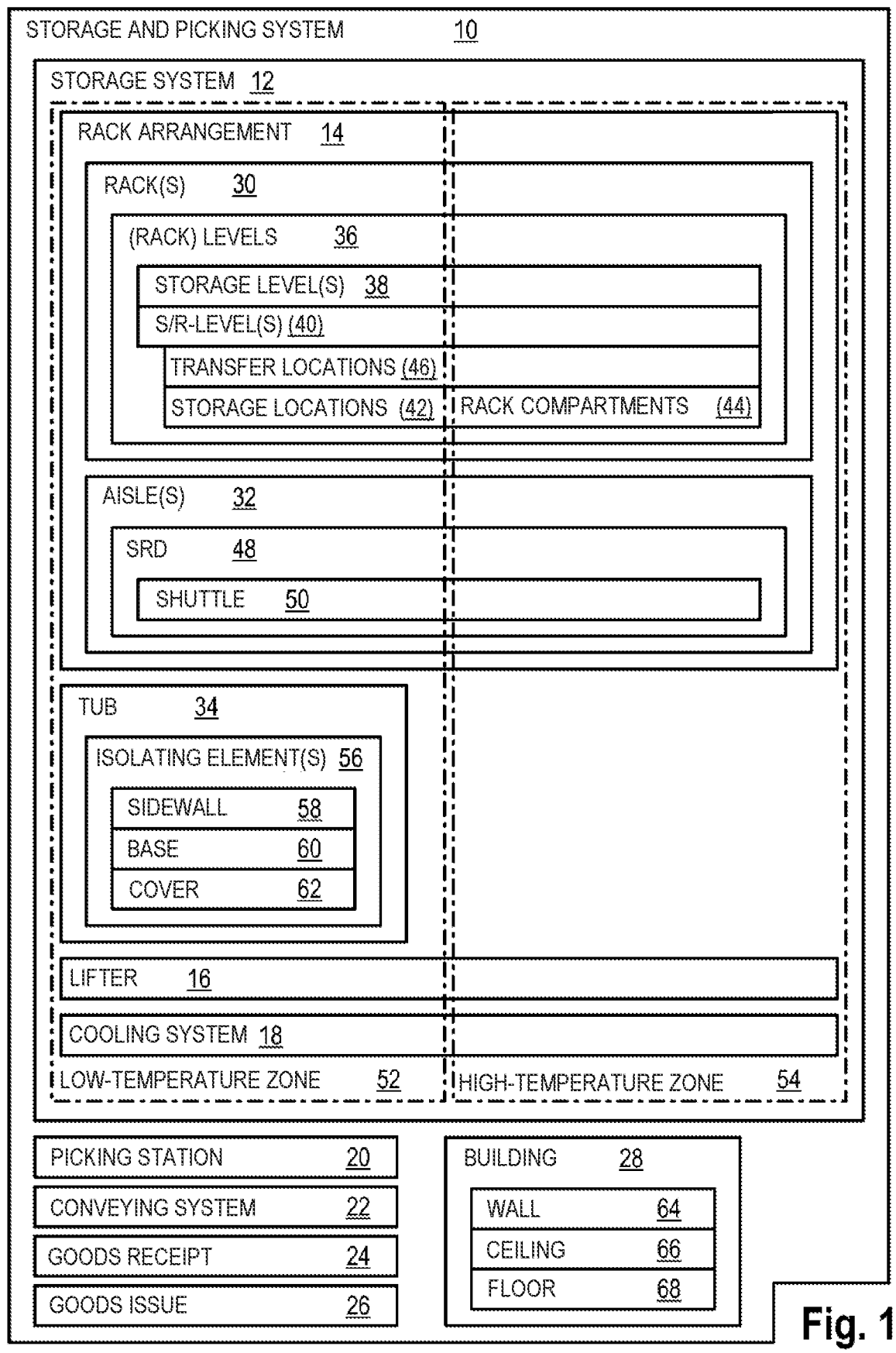

FIG. 1 shows a schematic block diagram of an exemplary storage and picking system 10 (used in intralogistics) including the (fully automated) storage system 12, which will also be designated briefly as system 12 in the following.

The storage system 12 comprises at least two zones (i.e. three-dimensional regions) where different operating temperatures prevail. This is achieved by enclosing at least one special region of the storage system 12 by means of a tub 34 which is open upwards, as exemplarily illustrated in FIGS. 2 to 4, wherein within the tub 34 a temperature prevails lower than in the remaining outer environment, as it will be explained in more detail below.

In general, the storage system 12 comprises: a rack arrangement 14, at least one lifter 16, a tub 34, and a cooling system 18, cf. FIG. 1.

FIG. 2 shows an rack arrangement 14 formed of, for example, two (single) racks 30-1 and 30-2, which represent rack rows, and one (rack) aisle 32, i.e. a rack aisle therebetween. In FIG. 2, for example, two lifters 16 are provided arranged at a face side adjacent to the racks 30. Each of the racks 30 of FIG. 2 is associated with its own lifter 16 by providing respectively one of the lifters 16 in the extension of each of the racks 30.

A rack 30 is generally understood to mean a frame (rack construction) made of steel, which is positioned on the (building) floor 62 and/or fixed to a (building) wall. The frame is typically formed of vertical posts (supports) and horizontal longitudinal and cross beams, which may be provided at outer sides of the rack in addition to obliquely oriented reinforcement struts. The racks 30 are vertically divided into rack levels 36 comprising a plurality of rack compartments 44 arranged next to each other for depositing and storing storage goods 70. The rack compartments 44 may comprise continuous shelves, grid-like shelves, or webbed shelves.

In general, the lifters 16 are conveying elements arranged stationary and configured to transport the storage goods 70 (e.g., pallets, totes, trays, cartons, etc. with and without material or products). Vertical conveyors and elevators are exemplary lifters 16.

The cooling system 18 (which is not shown in FIG. 2) can be positioned within or outside the rack arrangement 14. The cooling system 18 is configured to influence climate in the storage system 12. The term "climate" is understood in the following to mean an artificially created relationship between temperature and humidity in a closed space, in particular within the rack arrangement 14. The climate is generated by the cooling system 18, which is configured to provide air at a predetermined temperature, and preferably with a predetermined air humidity. The cooling system 18 ensures that the air in the low-temperature zone 52 is cooler than in the high-temperature zone 54.

The storage and picking system 10 of FIG. 1 can further comprise one or more of the following components: at least one picking station 20; a conveying system 22; a system control (not shown), preferably including a material-flow computer, a warehouse management computer, and/or other controlling and managing computers; a goods receipt 24, and a goods issue 26. The components of the system 10 are typically installed in a building 28.

Articles, products, goods, materials, and the like are collected at the picking station 20 in accordance with (customer or production) orders, such as by picking them from storage totes in accordance with the order, which defines an article type and a number, and putting same into an order tote.

The conveying system 22 connects, in terms of material flow, the storage system 12, the picking station 20, the goods receipt 24, and/or the goods issue 26, if present. The conveying system 22 is a technical system of the internal material flow for changing location (transport) of the storage goods 70, which includes a plurality of (single) conveyors (not shown) connected to each other and forming a transport network (not shown) structured complex. Each of the conveyors is a machine for conveying the storage good 70 which can then be packed later by human or packing robots (pickers) as packing piece onto or into an order tote. The conveying system 22 can extend into the rack arrangement 14, or at least adjoins it.

Each of the racks 14 generally comprises a plurality of rack levels 36 arranged vertically on top of each other, which comprise at least one storage level 38 and preferably one storage/retrieval level (S/R-level) 40.

Each of the rack levels 36 includes a plurality of storage locations 42 arranged (horizontally) next to each other, which are defined within rack compartments 44. The rack levels 36 may further include transfer locations 46, which may also be defined by the rack compartments 44. The transfer locations 46 are arranged in the immediate vicinity of the lifters 16, and can be located also outside the racks 30.

Each of the storage locations 42 is a rack location where the storage goods 70 can be stored one behind the other in a single-deep (cf. FIG. 2) or multiple-deep (not shown) manner. The storage locations 42 are coupled directly to the aisle 32. The aisle 32 is adjacent to at least one, preferably two, of the racks 14 so that storage and retrieval devices 48 may store and retrieve the storage goods 70 (directly) in a transverse direction Z in and from the storage locations 42. The storage and retrieval devices 48 move within the aisle 32 in the longitudinal direction X along the racks 14.

Preferably, such storage and retrieval devices 48 are used which allow serving of one single one of the rack levels 36 (without lifting functionality) or alternatively some few (e.g., two) of the rack levels 36 (then including lifting functionality). Such storage and retrieval devices 48 can also be called shuttles 50, in particular when one-level storage and retrieval devices are used, which are not provided without any lifting functionality and which serve only one single one of the levels 36. In the following, only shuttles 50 will be exemplarily considered as the storage and retrieval devices. It is understood that the shuttles 50 can be replaced with any other type of storage and retrieval device.

The transfer locations 46 represent interfaces of material flow between the shuttles 50 and the lifters 16. The transfer locations 46 decouple the shuttles from the lifters 16 in terms of material flow.

The storage system 12 further comprises at least two temperature zones, one low-temperature zone 52 and one high-temperature zone 54. The low-temperature zone 52 is defined by the tub 34 and enclosed by the tub 34. The tub 34 is configured to trap and hold cooled air. The tub 34 defines a bigger deeper longitudinal region being at least partially (cf. FIGS. 2B, 2C, and 2D), or preferably completely (cf. FIGS. 2A, 2B, and 2C), open at the top, i.e upwards.

Open upwards generally means that section through the tub 34 in a vertically oriented plane can be substantially U-shaped. The U-shape is characterized by vertically oriented tub legs being connected to each other by a horizontal insulating base.

It is understood that the legs do not need to be oriented accurately at 90° relative to the base. The legs and the base can also be arranged trapezoidal.

In general, the tub 34 comprises one or more (thermally) insulating elements 56. The insulating elements 56 are configured to keep an exchange of heat as low as possible between the air within the tub 34 and the air outside of the tub 34, i.e. with the environment (high-temperature zone 54). The insulating elements 56 can be implemented, for example, by thermal-insulation plates (e.g., made of rock wool, hemp fibers, cellulose, polystyrene, etc.), a metal-coated plastic film (similar to a rescue blanket), a thermal-insulated awning (having recesses for rack posts or the like), roll-down curtains, or the like.

The tub 34 can be formed of one or more sidewalls 58 and a base 50. Optionally, also a ceiling of one or more optional covers 62 can be provided, wherein preferably no cover 62, or ceiling, is used, as shown in the variation of the storage system in accordance with the FIGS. 2A, 2B and 2C.

In the variation in accordance with the FIGS. 2A, 2B and 2C, a tub 34, which is completely open upwards, is formed of four plate-like sidewalls 58-1 to 58-4 and one plate-like base 60. The sidewalls 58-1 to 58-4 are oriented vertically and connected to each other in corner regions for being closed circumferentially. The base 60 is oriented horizontal, and is also connected to the sidewalls 58-1 to 58-4 so that the tub 34 is also closed downwards. The sidewalls 58 and the base 60 also define a region being closed laterally, or circumferentially, and downwards, which corresponds to the low-temperature zone 52 and is completely open upwards. The connection of the sidewalls 58 and the base 60 is substantially sealed so that almost any (cooled) air can escape laterally or downwards from the tub 34.

In FIG. 2 the base 60 of the tub 34 is exemplarily implemented by an insulating element 56. It is understood that the base 60 of the tub 34 can also be realized by a floor 68 of the building 28 (cf. FIG. 1) (not shown in FIG. 2). In this case, the sidewalls 34 are positioned directly on the floor 68 of the building.

The same applies for one or more of the sidewalls 58 of the tub 34 in FIG. 2, which may be realized by walls 64 of the building 28 (cf. FIG. 1).

As an alternative to the plate-shaped insulating elements 56, as shown in FIG. 2, the tub 34 may also be realized, for example, by (preferably one single) tub-shaped spanned film (if necessary, including a frame) preferably comprising prefabricated holes through which the parts of the frame of the rack 30 may penetrate. This configuration is particularly advantageous if the low-temperature zone 52 is not to be arranged at the lowest rack level 36 but higher, for example, in the center, of the racks 30, because the S/R-level 40 is arranged, for example, on the floor 68 of the building.

However, it is preferred to position the tub 34 at the very bottom of the building 28, in particular because cold air drops and warm air rises. Due to the arrangement of the tub 34 in a lower, preferably the lowest, section of the rack arrangement 14, and particularly in a lower/lowest section of the rack 14 and aisle 32, the undesired thermal exchange due to natural convection is held as small as possible.

The tub 34 of FIG. 2 encloses, for example, the lowest three rack levels 36-1 to 36-3 of the rack arrangement 14, cf. FIGS. 2A and 2D. The racks 30-1 and 30-2 of FIG. 2 respectively comprise, for example, eight rack levels 36-1 to 36-8, which are preferably distanced equal vertically, wherein at each of the levels 36, for example, eight storage locations 42 are arranged next to each other being defined by eight rack compartments 44. It is understood that the tub 34 may enclose more or less levels 36, and the racks may comprise more or less than eight levels 36 and eight locations 42, or compartments 44, in a row.

Within the aisle 32 of FIG. 2, preferably at each of the levels 36, one of the rail-guided shuttles 50 is provided for transversely storing and retrieving the storage goods 70 in the direction Z into the storage location 42 and transfer location 46. The shuttles 50 are generally movable along the racks 30 on rails (not designated in more detail), which are mounted laterally fixed to the racks 30. In FIG. 2 the shuttles 50 never leave the lowest three levels 36 of the tub 34. The tub 34 of FIG. 2 is not configured to allow these shuttles 50 to pass.

In FIG. 2 the lifters 16 are the only material-flow connection, which is oriented vertically in this case, of the three lowest rack levels 36, i.e. the tub 34, to the environment. The three lowest rack levels 36 of FIG. 2 thus are pure storage levels 38. In FIG. 2 the storage goods 70 exit the rack arrangement 14, for example, in the fourth level 36-4 (to the right in FIG. 2B) arranged outside and above the tub 34. In this configuration, the fourth level 36-4 represents the S/R-level 40, which is also usable for storing and connected to the conveying system 22 (not illustrated) via a corresponding conveyor terminal (cf. illustration in stroke lines right in FIG. 2B). Therefore, the lifters 16 in FIG. 2 are the only components changing, due to their up and down movement, between the different temperature zones 52 and 54 (comparable to a piston) and thus allowing an exchange of air—and therefore an exchange of heat. Preferably, the movement of the lifter 16 at the transition between the zones 52 and 54 is decelerated for moving less air.

In contrast to the tub 34 being "completely open upwards", as shown in FIGS. 2A-C, the tub 34 may also be open at the top (in top view) preferably in the region of the lifters 16 only. In particular, in this case the tub 34 is open only where the elements of the lifters 16 move in the vertical direction. In the following, this will be called a tub 34 being "partially open upwards" in this context. This variation of the storage system 12, which includes the tub 34 being only partially open upwards, i.e. in the area of the lifter(s) 16, is illustrated in the FIGS. 2C and 2C, wherein FIG. 2B still shows the side view, which also applies to this variation.

In top view of FIG. 2C the low-temperature zone 52 is formed closed downwards in the region of the storage locations 42, and preferably also in the region of the transfer locations 46, cf. dotted hatching in top view of FIG. 2C applicable only to this variation. Also in the sectional view of FIG. 2D it can be seen that the aisle 32 and the storage locations 42 are completely closed upwards at the height of the third level 36-3. This is implemented by a tub ceiling of one or more of the covers 62, a film, an awning, or the like.

The openings remaining in the horizontal tub ceiling for the vertical movable components of the lifters 16 can be "closed" by an air curtain, which will be explained in more detail in the context of FIG. 4C.

In general it is true that the tub 34 can enclose more than two racks 30 including an aisle 32 therebetween, for example, by providing the rack-aisles arrangement of FIG. 2 in the transverse direction Z (cf. FIG. 3) and/or in the longitudinal direction X (cf. FIG. 4) multiple times directly adjacent to each other, and the tub 34 also enclosing the same, if necessary.

Further, it is understood that more or less than two lifters 16 can be provided within the tub 34. Also, it is understood that the lifters 16 can also be integrated (e.g., centrally, cf. FIG. 3A) into the racks 30.

The tub 34 of FIG. 2 is easily accessible from the outside (maintenance).

The tub 34 does not comprise any ceiling or covers. In the vertical direction Y any storage-location capacity is wasted. The vertical partition of the rack levels 36 can remain unchanged, in particular when the tub 34 is provided in the lowest level(s) 36.

FIG. 3 shows a further rack arrangement 14 in top view (FIG. 3A) and side view (FIG. 3B), where a tub 34 being open completely at the top encloses several racks 30-1 to 30-6 defining three aisles 32-1 to 32-3 therebetween. The tub 34 of FIG. 3 exemplarily encloses the two lowest rack levels 36-1 and 36-2 of the six racks 30-1 to 30-6.

Each of the racks 30-1 to 30-6 of FIG. 3 in turn defines respectively at least one group of contiguous storage locations 42. All contiguous groups are arranged within the tub 34 and can extend over one or both levels 36-1 and 36-2 (cf. FIG. 3B). FIG. 2 shows, for example, two groups of contiguous storage locations 42 over three levels 26, wherein each of the groups is defined in one of the racks 30-1 and 30-2.

The first rack 30-1 of FIG. 3 in turn defines two groups, one to the left and one to the right of the rack-integrated lifter 16-1, which is arranged centrally, for example. The same applies to the racks 30-2, 30-4, and 30-6 of FIG. 3. The racks 30-3 and 30-5 either define, for example, respectively one single group of fourteen (two levels on top of each other, each having seven locations next to each other) contiguous storage locations 42, or alternatively two groups of respectively seven storage locations 42 on top of each other (in both levels, respectively seven locations next to each other).

It is understood that the boundaries between the groups can be drawn arbitrarily, as long as the storage locations 42 are connected to each other, (in X and/or Z) next to each other and/or (in Y) on top of each other, directly, i.e. without any distance in terms of additional storage locations, partitioning devices (e.g., walls), or the like. For example, the storage locations 42 in the two racks 30-2 and 30-3 of FIG. 3 can form even one single group together.

Figure 4A:
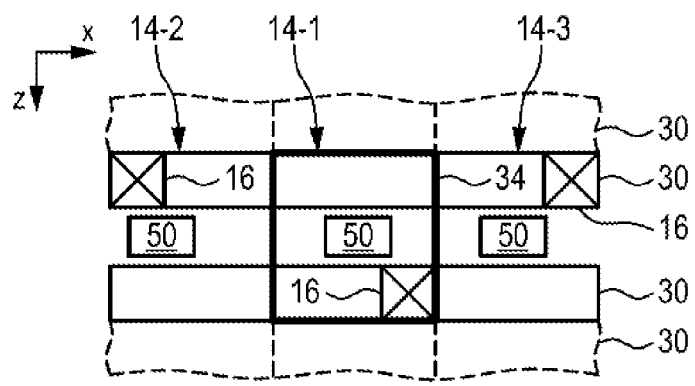
FIG. 4 shows top view (FIG. 4A) and side view (FIG. 4B) of a further modified system, and side view (FIG. 4C) of a still further modified system.
Figure 4B:
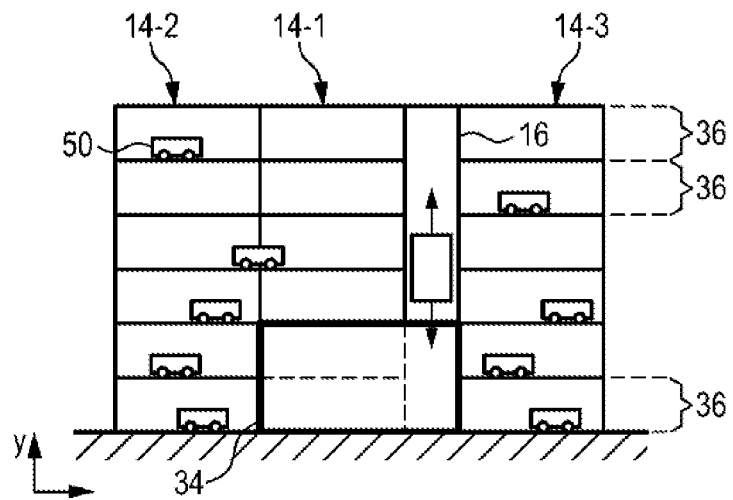

FIG. 4 shows a further embodiment in top view (FIG. 4A) and side view (FIG. 4B), where a tub 34 opened upwards is provided, which is formed in a central rack arrangement 14-1 formed of two racks 30, one aisle 32 therebetween, and one single rack-integrated lifter 16. To the left and right of the central rack arrangement 14-1 further rack arrangements 14-2 and 14-3 are provided, which are immediately adjacent to the central rack arrangement 14-1 in the longitudinal direction X. The outer rack arrangements 14-2 and 14-3 respectively comprise one further lifter 16, but no tub 34. The rack arrangements 14-2 and 14-3 are both positioned completely in the high-temperature zone 54. Only the three lowest rack levels 36 of the central rack arrangement 14-1 of FIGS. 4A and 4B are positioned in the low-temperature zone 52. The remaining levels 36 of the rack arrangement 14-1 also are arranged above the tub 34 in the high-temperature zone 54. The shuttles 50 in the lowest three levels 36 of the central arrangement 14-1 cannot leave the tub 34, whereas the shuttles 50 in the upper three levels 36 may travel through each of the three arrangements 14-1 to 14-3. This means that each of the three upper levels 36 of the arrangements 14-1 to 14-3 of FIGS. 4A and 4B can be operated by one single shuttle 50 only in order to reduce an overall number of shuttles 50 used.

Figure 4C:
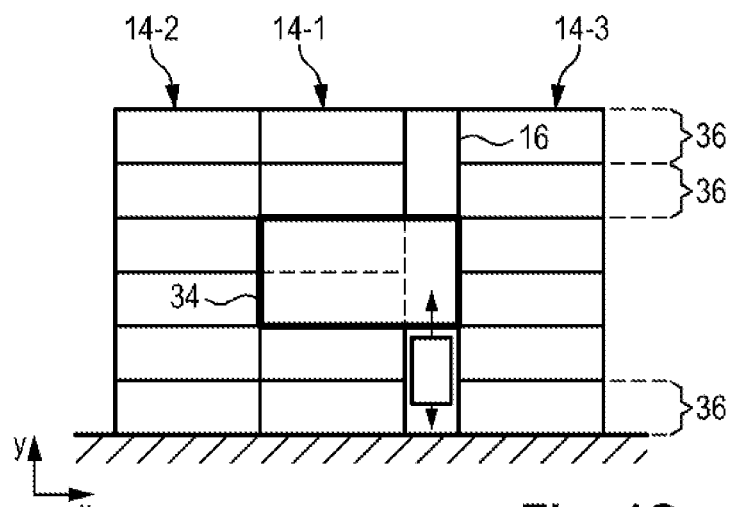

FIG. 4C shows a modification of FIGS. 4A and 4B, wherein only the vertical positioning of the tub 34 is changed. The tub 34 of FIG. 4C is arranged at level of the third and fourth rack level 36. The tub 34 of FIG. 4C may be implemented by the above-mentioned film, which is spanned throughout the frame of the racks 30. In the region of the lifter 16 of the central arrangement 14-1 of FIG. 4C, there is provided a, preferably closable, opening (not illustrated), which allows penetration of the lifter 16 in the vertical direction Y, in the base 60 of the tub 34. This opening can be opened and closed, actively controlled, by a horizontally movable plate, or can be closed permanently in a passive manner by a horizontally oriented air curtain (not illustrated) for allowing the lifter 16 to pass vertically. The air curtain separates the interior of the tub 34, i.e. the low-temperature zone 52, from the high-temperature zone 54 arranged below. In the region of the lifter 16 the air curtain prevents cooled air—due to natural convection—to emerge downwards.

In general, an air curtain can be generated by a nozzle from which a fast air jet emerges. The thin-layered air jet is comparable to a blade, and therefore is also called "Air Knife", air cutter, or air sword. The air jet preferably flows laminar. The air curtain is a device which separates, by means of a strong fan, differently conditioned air masses, i.e. the zones 52 and 54, by a barrier of flowing air, and thus prevents an exchange.

The flow of air can circulate between an outlet opening and an intake opening in terms of an air roller. Such devices are also called air veil which are used, for example, at entrances of department stores, at gates of industrial installations and factory buildings, or at entrance areas of railway stations and airports.

In general, it is possible to use a horizontally orientated air curtain, or air veil, for "closing" the tub 34 also upwards, for example, even with the tubs 34 of FIGS. 2 to 4.

Returning to FIG. 4C, the levels 36, or the storage locations 42 provided there, of the arrangement 14-1 beneath the tub 34 can be supplied, also via the shuttles 50 of the arrangements 14-2 and/or 14-3 travelling in this case in the longitudinal direction X through each of the three arrangements 14-1 to 14-3.

The positioning of the tub 34 in accordance with FIG. 4C alone requires more efforts in view of fire protection because extinguishing water, which is supplied via a building ceiling, cannot run without problems through each of the levels 36 of the racks 30 at the location of the tub 34. In this case, the tub 34 can comprise additional closable openings (not illustrated) for discharging collected extinguishing water. Beneath the tub 34 additional extinguishing water lines and—extinguishing water dispensers—can be further installed in order to enable to extinguish even the levels 36 beneath the tub 34. This slightly increases an installation effort and the investment costs, but does not restrict a designer of a facility layout, for example, where to position the S/R-level(s) 40 and/or the picking stations 20 relative to the low-temperature zone 52.

FIG. 4C illustrates that the tub 34 can be arranged in an arbitrary position and at an arbitrary height within the storage system 12, which can be constructed of arbitrarily many and arbitrarily dimensioned rack arrangements 14.

Figure 5:
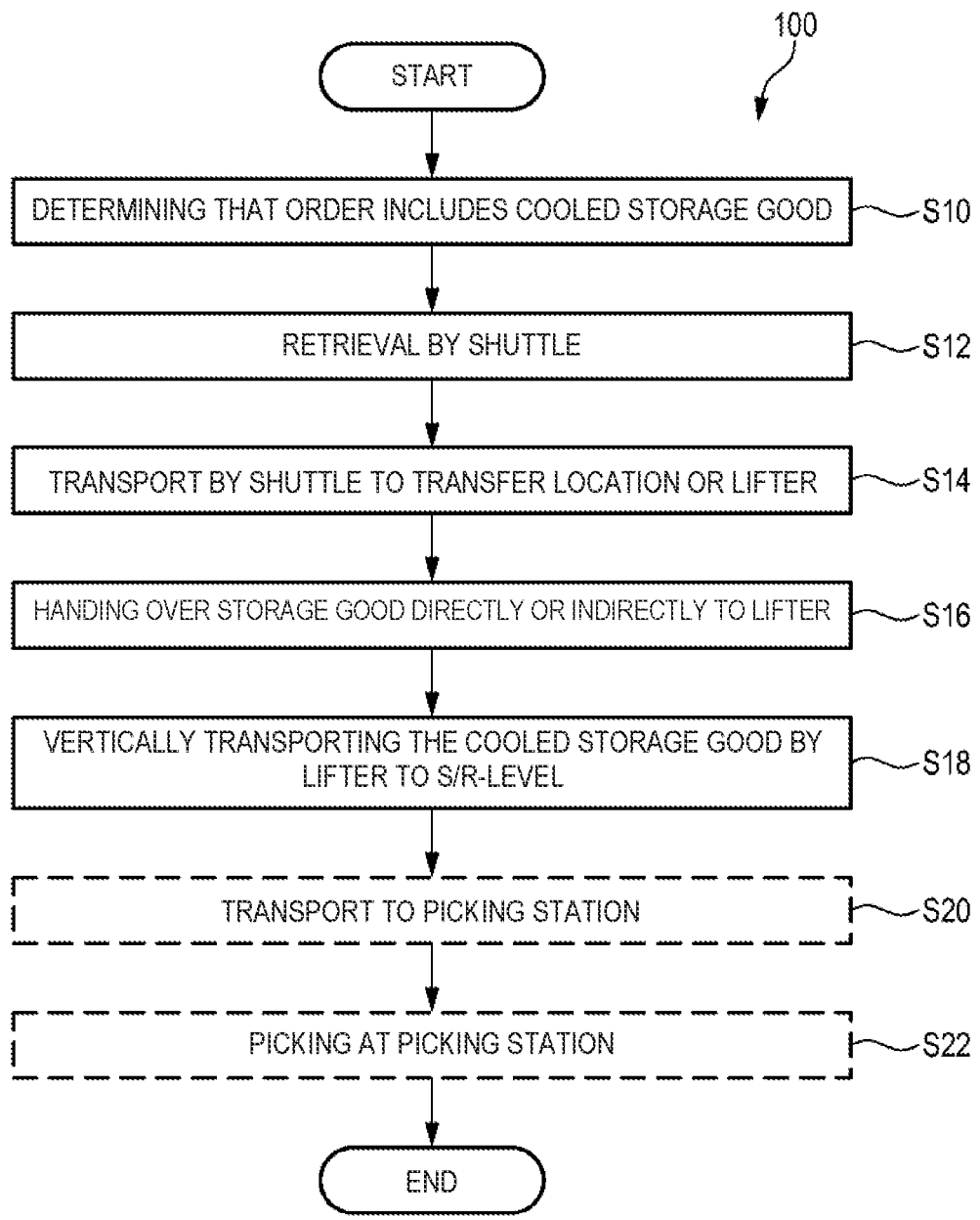
FIG. 5 shows a flow chart of a method for picking cooled and uncooled storage goods.

FIG. 5 illustrates a method 100 for picking one or more cooled storage goods 70, which are stored in a low-temperature zone 52 defined within a tub 34 of the above-described type being open upwards and circumferentially and being substantially closed downwards, of an automated storage system 12 of the above-described type, as well as for picking uncooled storage goods 70 stored in a high-temperature zone 54 of the storage system 12. The picking takes place in accordance with an order, such as an online food order of a customer, or an order to mount an intermediate product for forming a final product in a production facility. The method 100 comprises several steps.

In a first step S10 the control (e.g., an order management module) determines whether an order exists which includes at least one cooled storage good 70. If the order includes such a cooled storage good 70, the corresponding storage location 42 is determined, for example, by warehouse-management computer. Material-flow computer generates, based on the storage location 42 (starting point) and picking station 20 (destination point), a corresponding transport order. The transport order defines elements of the conveying system 22 required for moving the so-determined cooled storage good 70 from its storage location 42, in the tub 34, to the assigned picking station 20. The transport order also defines when the individual transport orders are to be performed by the elements of the conveying system involved.

In step S12 the corresponding shuttle 50 is moved horizontally on the rack level 36, where the storage location 42, or the rack compartment 44, of the cooled storage good 70 is located, within the tub 34 to this storage location 42. Then, the cooled storage good 70 is retrieved by the shuttle 50. For the retrieval, only shuttles 50 can be used, which are already located within the tub 34 since the sidewalls 48 cannot be passed by the shuttles 50, as explained above.

In step S14 the retrieved cooled storage good 70 is transported by the shuttle 50 either to a corresponding transfer location 46 of this rack level 36, which is arranged adjacent to the lifter 16, or directly to the lifter 16. The lifter 16 extends vertically into the tub 34, as described above.

Then, in step S16, the retrieved cooled storage good 70 is handed over either directly to the lifter 16, or indirectly to the lifter 16 via the transfer location 44, i.e. it is transferred. Then, the lifter 16 transports the cooled storage good 70, which has been transferred before, from the tub 34 to a storage/retrieval level 40 of the rack 30 (step S18), wherein the storage/retrieval level 40 is in the high-temperature zone 54.

From there, the cooled storage good 70 can be transported via the remaining conveyor elements (for example, continuous conveyors such as roller or belt conveyors, or discontinuous conveyors such as driverless transport vehicles), which have been determined before, to the picking station 20 (step S20), which has been assigned to the order before. Subsequently, the picking (e.g., removal of articles from storage tote and disposal into order tote) can be conducted at the picking station 20 in an automated manner (robot) or manually (human) (step S22).

After the picking, the storage good 70 can be transported back, as long as it has not been completely consumed at the picking station 20, to its old storage location 42—or to a different storage location 42—within the tub 34 on a reverse transport path and can be stored again.

Figure 6A:
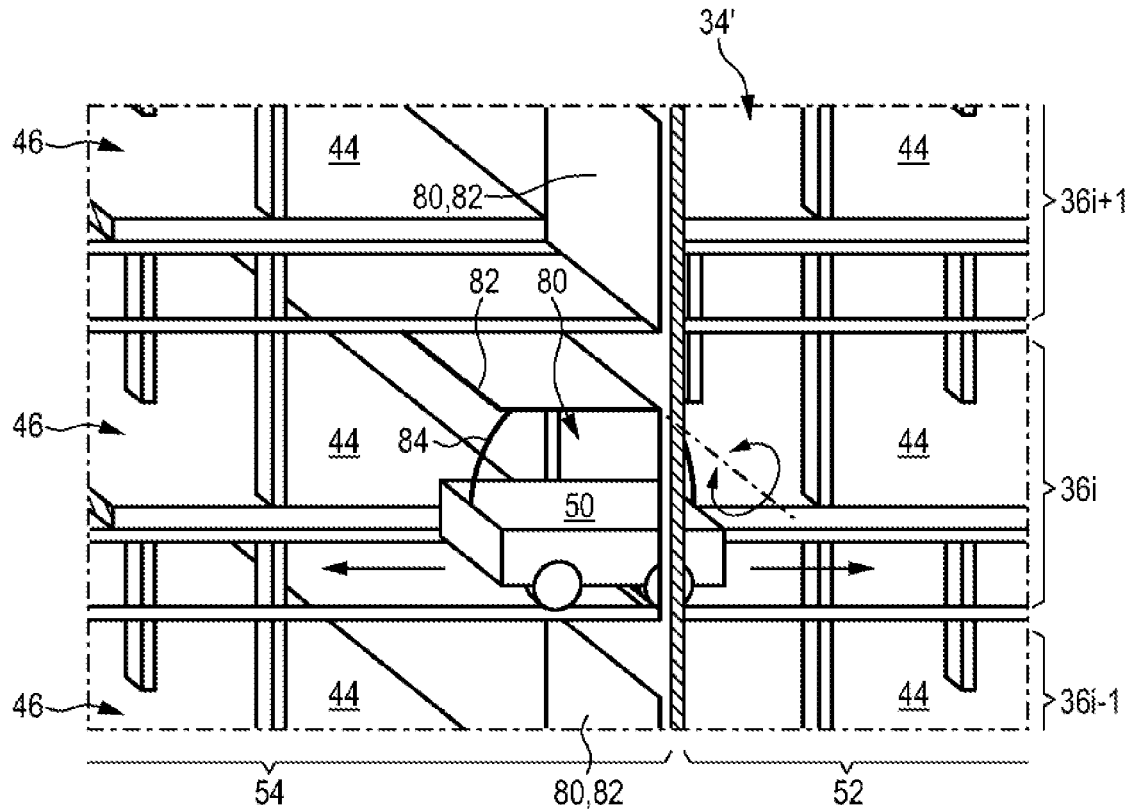
FIG. 6 shows a perspective view in detail (FIG. 6A) of a tub, which can be penetrated by shuttles, and a top view (FIG. 6B) of a different automated storage system.
Figure 6B:
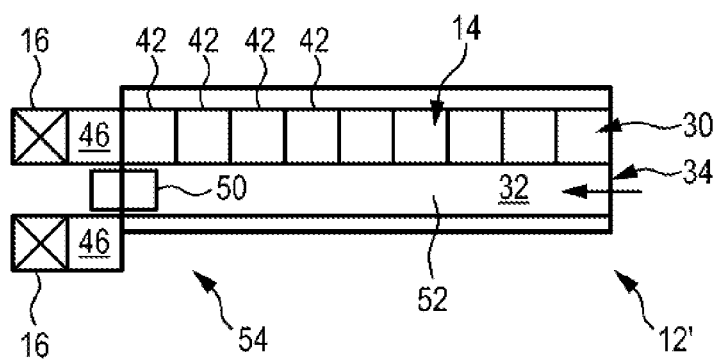

FIG. 6 illustrates two further modifications. FIG. 6A shows a perspective view in detail of a modified side (e.g., face side in plane YZ) of a tub 34 comprising a passage opening for shuttles 50. FIG. 6B illustrates a modified storage system 12' in top view.

The storage system 12' of FIG. 6B includes a rack arrangement 14 formed of, for example, only one rack 30 including several rack levels 36 on top of each other, and of one aisle 32, which adjoins the one rack 30 directly laterally. Shuttles 50 are operated in the aisle, preferably one shuttle 50 on each level 36. The tub 34 of FIG. 6B encloses some of the levels 36 circumferentially as well as downwards by means of a base 60 and upwards by means of a ceiling (not illustrated). The tub 34 of FIG. 6B thus additionally includes—contrary to the tubs 34 described before—the ceiling of at least one horizontal cover 62, which closes the corresponding low-temperature zone 52 even upwards in a sealed manner.

Further, for example, in FIG. 6B two lifters 16 are provided outside the tub 34, which is completely sealed against the outside. Within the tub 34 of FIG. 6B, no lifters 16 are provided. The external lifters 16 can be connected in terms of material flow via transferring locations 46 to the shuttle(s) 50. In this case, the transfer locations are also located outside the tub 34, and preferably are directly adjacent to the tub 34, so that the shuttles 50 need to rest outside the tub 34, during transfer of storage goods, only as short as necessary.

At least the face-side sidewall 58 of the tub 34, which faces directly the transfer locations 46 and the lifter 16, comprises, preferably at each of the levels 36, one reclosable opening 80 for allowing the shuttles 50 to travel through the tub 34. This is exemplarily illustrated in FIG. 6A. It is understood that the (passage) opening 80 could also be present, for example, in the tubs 34 of FIGS. 2-4, in this case however for maintenance purposes so that the shuttles 50 can be moved out of the corresponding tub 34, but not in view of material-flow aspects.

The opening 80 represents, for the storage system 12' of FIG. 6B, a (horizontal) connection, in terms of material flow, between the cooled storage locations 42 within the tub and the lifters 16 outside the tub 34. The opening 80 of FIG. 6 is closable by a flap 82 supported in a swiveling manner. The swiveling movement is caused by the shuttle 50. The flap 82 is thus operated passively, and is preferably provided without any dedicated drive. The flap 82 of FIG. 6 is pivotable about an axis extending parallel to the transverse direction Z. The shuttle 50 is provided with a mechanical guide, such as an arc-shaped hanger 84 extending from the front of the shuttle 50 upwards and backwards, for holding mechanically open the flap 80 during the passage of the shuttle 50 through the tub 34, as shown in FIG. 6A. The flap 82 is moved back into its closed position by gravity alone.

It is understood that the flap 82 can be equipped alternatively with its own drive so that the mechanical guide can be avoided at the shuttle 50, whereby, however, controlling effort is increased.

The flap 82 could also be hinged at the bottom of the opening instead of at the top, wherein a spring element is to be provided additionally for moving the flap 82 into the closed position. Also in this case, there is no need for an additional guidance on the shuttle 50, because the shuttle 50 pushes open the flap 82 with its front and holds it down with its base.

The opening 80 could be closed by more than one flap 82, such as two or four flaps 82 (not illustrated), closing the opening 80 together.

Since the shuttle 50 itself moves the storage goods 70 out of the low-temperature zone 52, additional transfer conveyors at the interface between inside and outside the tub 34 can be eliminated. Only the shuttle 50 remains outside the tub 34 for a short time, without formation of condensation and/or ice. It is understood that the paths of the shuttles 50 outside the tub 34 are to be selected as short as possible in order to keep the dwell time outside the tub 34 as short as possible.

Alternatively, the wall of the tub 34 can comprise an extension (not illustrated) which encloses the aisle 32 only and extends to the transfer location 46. In this case, the opening 80 is in a wall of the tub 34, which is positioned between the transfer location 46 and the (shuttle) aisle 32, so that the shuttle 32 can remain, during the handing over/receiving of a storage good 70, within the tub 34 and only the storage good 70 alone is moved through the opening 80 by the load-handling device (e.g., telescopic arms, not illustrated).

It is understood that even the flap 32 may be replaced with an air curtain, as described above.

A further aspect of the present disclosure relates to an automated storage system (12), which includes a high-temperature zone (54) and a low-temperature zone (52), comprising: at least one rack (30) including several rack levels (36) on top of each other and including an aisle (32) laterally adjacent to the rack; a plurality of shuttles (50) in the aisle (32) for storing and retrieving storage goods (70) in and from storage locations (42) of the at least one rack (30) and for horizontally transporting the storage goods (70); a stationary lifter (16) for vertically transporting the storage goods (70); and a tub (34) defining the low-temperature zone (52); wherein, in a height region of at least one of the rack levels (36), the tub (34): encloses (exclusively) one group of contiguous storage locations (42) as well as part of the aisle (32), being adjacent thereto, circumferentially, upwards, and downwards; and comprises a closable opening in a face wall so that at least one of the shuttles (50) can (horizontally) penetrate through the tub (34) for delivering a retrieved storage good (70) directly, or indirectly (via a transfer location), to the lifter (16) positioned outside the tub (34).

10 storage and picking system
12 storage system
14 rack arrangement
16 lifter
18 cooling system
20 picking station
22 conveying system
24 goods receipt
26 goods issue
28 building
30 rack(s)
32 aisle(s)
34 tub
36 (rack) levels
38 storage level(s)
40 storage/retrieval level(s)
42 storage locations
44 rack compartments
46 transfer locations
48 storage and retrieval device (SRD)
50 shuttle
52 low-temperature zone
54 high-temperature zone
56 insulating element(s)
58 sidewall of 34
60 base of 34
62 cover of 34
64 wall (of building)
66 ceiling (of building)
68 floor (of building)
70 storage goods
80 re-closable opening in 34, in particular in 60
82 (swiveling) flap
84 hanger
100 storage and picking method

The invention claimed is:

1. An automated storage system, including a high-temperature zone and a low-temperature zone, comprising:
at least one rack including several rack levels on top of each other and an aisle laterally adjacent to the rack;
a plurality of shuttles in the aisle configured to store and retrieve storage goods in and from storage locations of the at least one rack, and to horizontally transport the storage goods;
a stationary lifter configured to vertically transport the storage goods; and
a tub defining the low-temperature zone;
wherein, in a height region of at least one of the rack level, the tub:
encloses, in a circumferentially closed manner, a group of contiguous storage locations and the lifter;
encloses, in a closed downwards manner, the group of contiguous storage locations;
encloses, in a closed, or closable, downwards manner, the lifter; and
is open upwards at least for the lifter.

2. The automated storage system of claim 1, wherein the low-temperature zone and the high-temperature zone are connected to each other, with regard to material flow, during normal operation of the storage system via the lifter only.

3. The automated storage system of claim 1, wherein each of the shuttles is operated either exclusively in the high-temperature zone or exclusively in the low-temperature zone.

4. The automated storage system of claim 1, wherein the low-temperature zone is operated at a temperature of more than 0° C., and wherein the high-temperature zone is operated at a temperature greater than the temperature of the low-temperature zone.

5. The automated storage system of claim 4, wherein the low-temperature zone is operated in a temperature range of 0° C. to 10° C.

6. The automated storage system of claim 4, wherein the high-temperature zone is operated at an ambient temperature.

7. The automated storage system of claim 1, further comprising at least one transfer location arranged within the tub between the lifter and the group of contiguous storage locations.

8. The automated storage system of claim 7, wherein the low-temperature zone is operated in a temperature range of 2° C. to 8° C.

9. The automated storage system of claim 1, wherein the tub is formed cover-free at least in the region of the lifter.

10. The automated storage system of claim 9, wherein the tub is completely cover-free.

11. The automated storage system of claim 1, further including a cooling system configured to supply air at a predetermined temperature to the low-temperature zone.

12. The automated storage system of claim 1, wherein the tub is formed of at least one of insulating elements, a film, or a thermal-insulated awning.

13. The automated storage system of claim 12, wherein the at least one of insulating elements, a film, and a thermal-insulated awning are plate-shaped or roll-down-curtain-like.

14. The automated storage system of claim 1, wherein the lifter connects each of the rack levels, in terms of material flow, vertically to each other.

15. The automated storage system of claim 1, wherein one of the rack levels is a storage/retrieval level positioned above or below the tub.

16. The automated storage system of claim 1, wherein the tub is completely open upwards.

17. A storage and picking system comprising the automated storage system of claim 1.

18. The storage and picking system of claim 11 further comprising at least one of the following components:
at least one picking station;
a conveying system;
a goods receipt; and
a goods issue.

19. A method for picking cooled storage goods stored in a low-temperature zone, which is defined within a tub being open upwards for one or more lifters of an automated storage system and uncooled storage goods, which are stored in a high-temperature zone of the storage system, in accordance with an order, wherein the method comprises:
determining that the order includes a cooled storage good;
moving a shuttle, exclusively within the tub, to a storage location of a rack where the cooled storage good, which has been determined before, is stored;
retrieving, by the shuttle, the cooled storage good;
transporting, by the shuttle, the retrieved cooled storage good to a transfer location of the lifter, or directly to the lifter, extending vertically into the tub, wherein the transfer location is also arranged in the tub;

transferring the retrieved cooled storage good directly to the lifter, or indirectly via the transfer location to the lifter; and vertically transporting, by the lifter, the transferred cooled storage good from the tub to a storage/retrieval level of the rack, wherein the storage/retrieval level is in the high-temperature zone.

20. The method of claim 13, further comprising:
transporting the cooled storage good to a picking station.

21. The method of claim 20, further comprising:
picking at the picking station.

22. The method of claim 19, wherein the tub is open upwards for the one or more lifters and otherwise closed.

23. The method of claim 19, wherein the automated storage system, which includes a high-temperature zone and a low-temperature zone includes: at least one rack including several rack levels on top of each other and an aisle laterally adjacent to the rack; a plurality of shuttles in the aisle configured to store and retrieve goods in and from storage locations of the at least one rack, and for horizontally transporting the storage goods; a stationary lifter configured to vertically transport the storage goods; and a tub defining the low-temperature zone; wherein, in a height region of at least one of the rack levels, the tub:

encloses, in a circumferentially closed manner, a group of contiguous storage locations and the lifter;

encloses, in a closed downwards manner, the group of contiguous storage locations;

encloses, in a closed, or closable, downwards manner, the lifter; and is open upwards at least for the lifter.

* * * * *